US010655708B2

(12) United States Patent
Bernard et al.

(10) Patent No.: US 10,655,708 B2
(45) Date of Patent: May 19, 2020

(54) EPICYCLIC GEAR TRAIN, ADVANTAGEOUSLY FOR A SERVOMOTOR SYSTEM, METHOD AND SERVOMOTOR SYSTEM USING SUCH AN EPICYCLIC GEAR TRAIN

(71) Applicant: BERNARD CONTROLS, Gonesse (FR)

(72) Inventors: Etienne Bernard, Paris (FR); Rémy Lepan, Bruyères sur Oise (FR)

(73) Assignee: BERNARD CONTROLS, Gonesse (FR)

( * ) Notice: Subject to any disclaimer, the term of this patent is extended or adjusted under 35 U.S.C. 154(b) by 159 days.

(21) Appl. No.: 15/846,355

(22) Filed: Dec. 19, 2017

(65) Prior Publication Data

US 2019/0120330 A1   Apr. 25, 2019

(30) Foreign Application Priority Data

Oct. 20, 2017   (FR) .................................... 17 59946

(51) Int. Cl.
| | |
|---|---|
| *F16H 3/62* | (2006.01) |
| *F16K 31/53* | (2006.01) |
| *F16K 31/05* | (2006.01) |
| *F16H 3/54* | (2006.01) |
| *F15B 13/04* | (2006.01) |
| *F15B 13/08* | (2006.01) |
| *F15B 15/20* | (2006.01) |
| *F16H 48/30* | (2012.01) |

(52) U.S. Cl.
CPC ............ *F16H 3/62* (2013.01); *F15B 13/0406* (2013.01); *F15B 13/0885* (2013.01); *F15B 15/202* (2013.01); *F16H 3/54* (2013.01); *F16K 31/055* (2013.01); *F16K 31/535* (2013.01); *F16H 2048/305* (2013.01); *F16H 2200/0034* (2013.01); *F16H 2200/2005* (2013.01)

(58) Field of Classification Search
None
See application file for complete search history.

(56) References Cited

U.S. PATENT DOCUMENTS

| | | | |
|---|---|---|---|
| 1,301,592 A | * | 4/1919 | Ovren ....................... F16H 3/54 |
| | | | 475/320 |
| 4,261,224 A | | 4/1981 | Sulzer |
| 4,569,252 A | * | 2/1986 | Harper ...................... F16H 3/78 |
| | | | 475/299 |

(Continued)

FOREIGN PATENT DOCUMENTS

| | | | |
|---|---|---|---|
| DE | 42 01 849 C1 | 12/1991 | |
| GB | 2102515 A * | 2/1983 | ............... F16H 3/60 |
| WO | WO 2009/027821 A2 | 3/2009 | |

OTHER PUBLICATIONS

French Republic National Institute of Industrial Property; Preliminary Research Report of National Registration No. FR 17 59 946, dated Jun. 28, 2018.

*Primary Examiner* — Dirk Wright

(74) *Attorney, Agent, or Firm* — Cantor Colburn LLP

(57) ABSTRACT

An epicyclic gear train for a servomotor system includes a case, and, positioned in the case, a planet carrier carrying planet gears, a ring gear, and a sun gear. The epicyclic gear train includes a control for changing input and output speed ratio in response to an input applied from outside the case.

11 Claims, 5 Drawing Sheets

(56) References Cited

U.S. PATENT DOCUMENTS

| | | | | |
|---|---|---|---|---|
| 5,655,986 | A * | 8/1997 | Wilson | B60K 17/3467 180/248 |
| 6,022,289 | A * | 2/2000 | Francis | B60K 17/3467 475/204 |
| 6,783,475 | B2 * | 8/2004 | Gazyakan | B60K 17/3462 180/249 |
| 6,821,227 | B2 * | 11/2004 | Williams | B60K 17/3467 475/204 |
| 8,574,115 | B2 * | 11/2013 | Atsumi | B25F 5/001 475/299 |
| 2010/0267508 | A1 | 10/2010 | Hvolka et al. | |

* cited by examiner

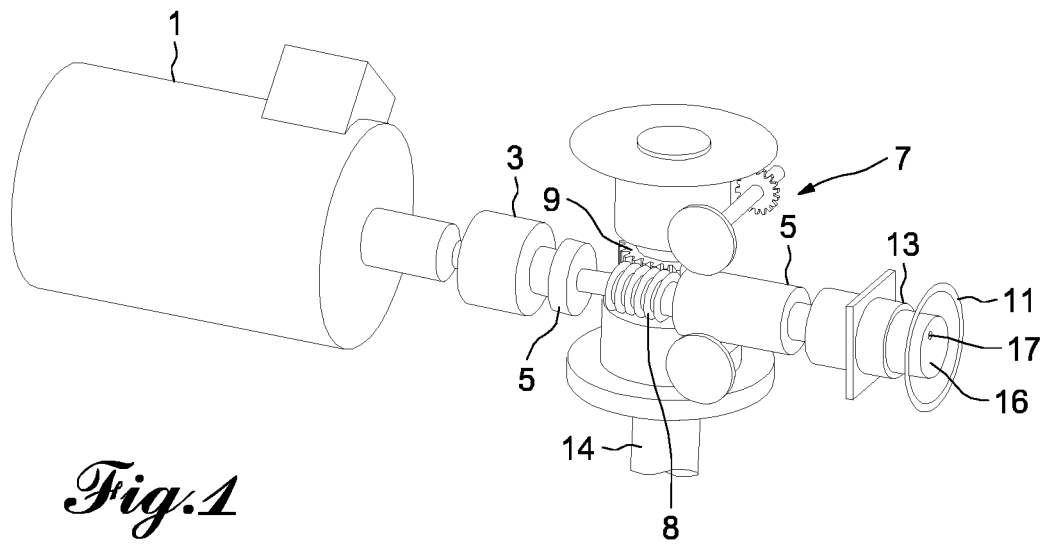
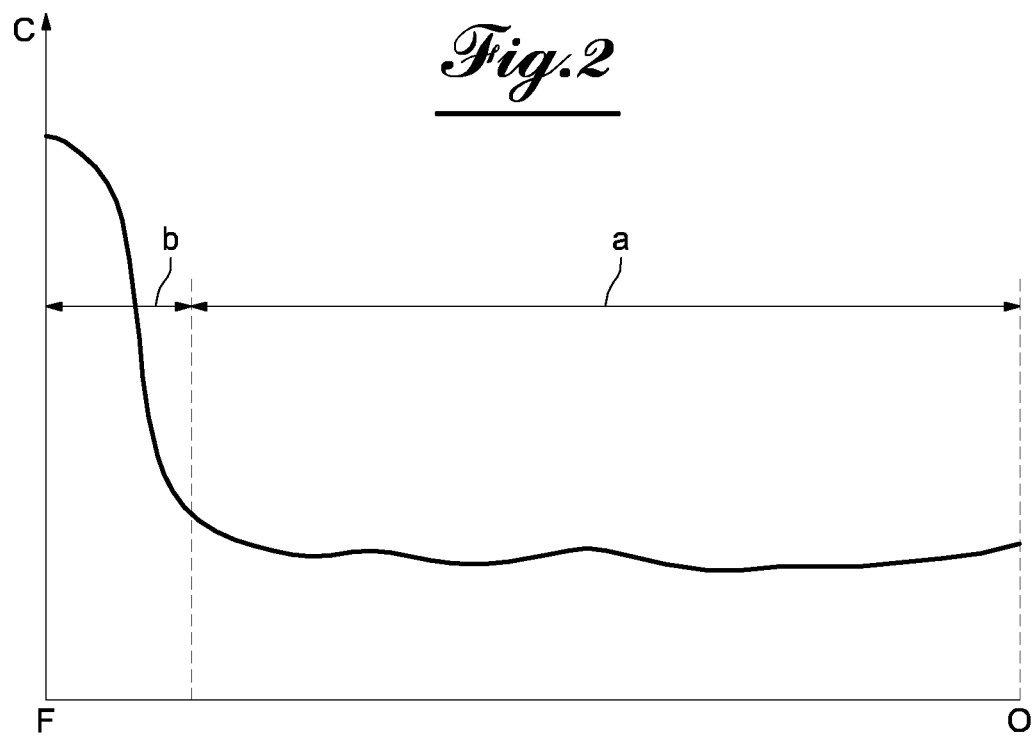

EPICYCLIC GEAR TRAIN, ADVANTAGEOUSLY FOR A SERVOMOTOR SYSTEM, METHOD AND SERVOMOTOR SYSTEM USING SUCH AN EPICYCLIC GEAR TRAIN

FIELD OF THE INVENTION

The invention relates to an epicyclic gear train, advantageously for a servomotor system, of the type comprising, contained in a case between an input shaft and an output shaft, a planet carrier, a ring gear and a sun gear, as well as a control method in particular for a valve and a servomotor system using such an epicyclic gear train and equipped with a hand wheel manual control mechanism.

BACKGROUND OF THE INVENTION

It is known that the force necessary to close a valve is not constant and changes based on the travel of the moving member, in the manner illustrated in FIG. 2. During the long approach phase of the moving member, i.e., before the arrival on the sealing seat of the valve, the necessary force is relatively constant and low and only increases considerably in the short tightening phase up until closing of the valve, the duration of which is generally shorter than 10% of the duration of the total travel. Yet in manually controlled hand wheel servomotor systems, which are known, the manual control mechanism of the valve is designed solely as a function of the short high-force phase without taking into account the much longer approach phase.

The invention aims to offset this drawback.

SUMMARY OF THE INVENTION

To achieve this aim, the invention proposes the use of an epicyclic gear train for transmitting the speed between the input and the output, which is characterized in that it comprises means for changing the gear ratio of the speeds, which can be actuated from the outside.

According to one advantageous particularity of the invention, the epicyclic gear train is characterized in that the ring gear is mounted rotating in the case and in that the control means are suitable for imposing, on the ring gear, a rotation speed determined to produce a first speed ratio and to secure the ring gear and the planet carrier in rotation to produce a second speed ratio.

According to another particularity, the epicyclic gear train is characterized in that the ring gear can be blocked in rotation by the control means.

According to still another particularity, the epicyclic gear train is characterized in that the ring gear and the satellite carrier are each provided with outer teeth and in that the control means comprise a pinion that is movable between a meshing position of only the outer teeth of the ring gear and a position securing the ring gear and the planet carrier in rotation by meshing of the outer teeth of the ring gear and the planet carrier.

According to still another particularity, the epicyclic gear train is characterized in that it produces, in the blocking position of the ring gear only, a multiplication of the speed transmitted between the input and the output and in its position securing the ring gear and the planet carrier in rotation, a transmission of the speed between the input and the output at the 1:1 ratio.

According to still another particularity, the epicyclic gear train is characterized in that the pinion is mounted on a rod that is movable axially in the case, parallel to the axis of the epicyclic gear train, and in that the rod comprises, at its outer end, a control member for changing the speed ratio and selecting the desired ratio.

According to still another particularity, the epicyclic gear train is characterized in that the change and selection of the speed ratio is done by pushing the control member into the case or pulling said member out from the case.

According to still another particularity, the epicyclic gear train is characterized in that the satellite carrier constitutes the input member and the sun gear constitutes the output member.

The method for controlling a rotating actuator member of a device such as a valve, by moving the rotating member by rotating a manual actuating hand wheel between an open position of the valve and a closed position of the valve, the movement from the open position to the closed position comprising a first phase for approaching the closed position in which the torque applied to the hand wheel is relatively low and a second phase for producing the closing, in which the torque to be applied to the hand wheel increases greatly, is characterized in that during the first approach phase, relative to the second phase, a multiplication of the number of revolutions is provided, between the hand wheel and the rotating member.

According to one advantageous particularity, the method is characterized in that an epicyclic gear train according to the invention is used to change the transmission speed.

According to another advantageous particularity, the method is characterized in that during the second phase (b) of the travel, the epicyclic gear train is used in its configuration in which the ring gear and the planet carrier are secured in rotation and during the first phase (a) in the configuration for separating the ring gear.

The servomotor system for controlling an actuator member of an opening and closing valve of a fluid flow pathway, such as a pipe, and provided with a manual control hand wheel for the actuator member, is characterized in that it comprises and an epicyclic gear train according to the invention.

According to one advantageous particularity, the system is characterized in that it implements the method according to the invention.

BRIEF DESCRIPTION OF DRAWING FIGURES

The invention will be better understood, and other aims, features, details and advantages thereof will appear more clearly, during the following explanatory description done in reference to the appended drawings, provided solely as an example illustrating one embodiment of the invention and in which:

FIG. 1 is a schematic view of a servomotor system according to the invention;

FIG. 2 is an operating diagram of a valve, and illustrates the relationship between the closing torque of the valve and the travel of the valve;

Figure 5:
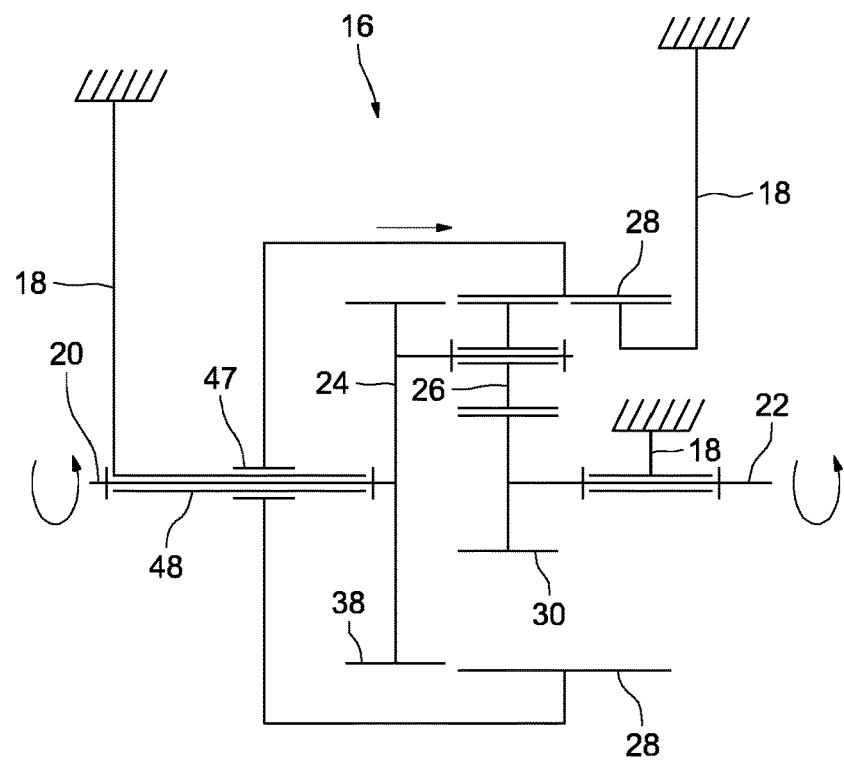
Figure 6:
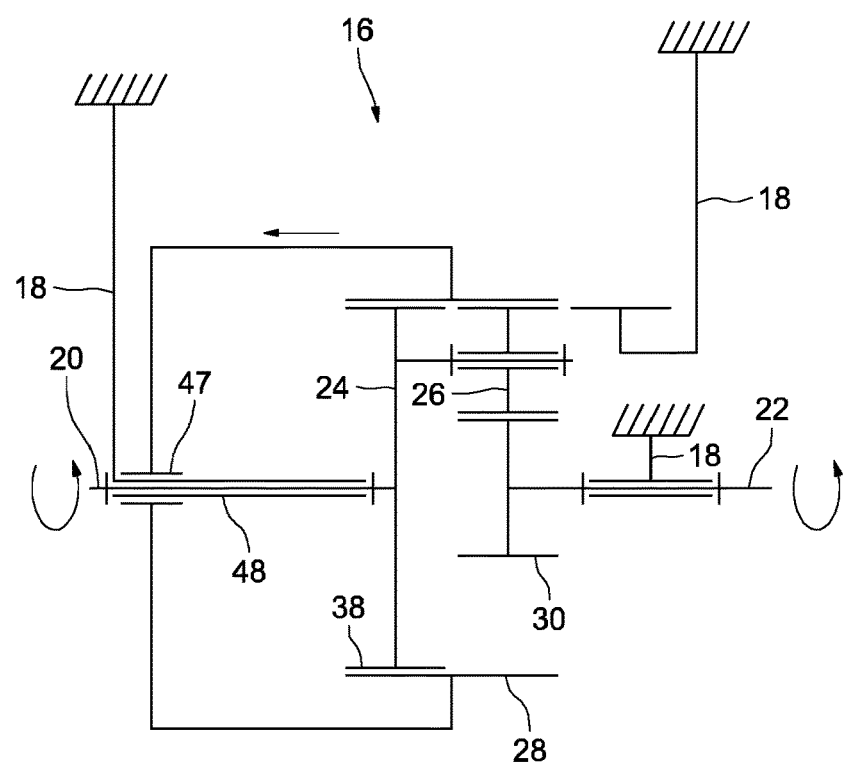
Figure 7:
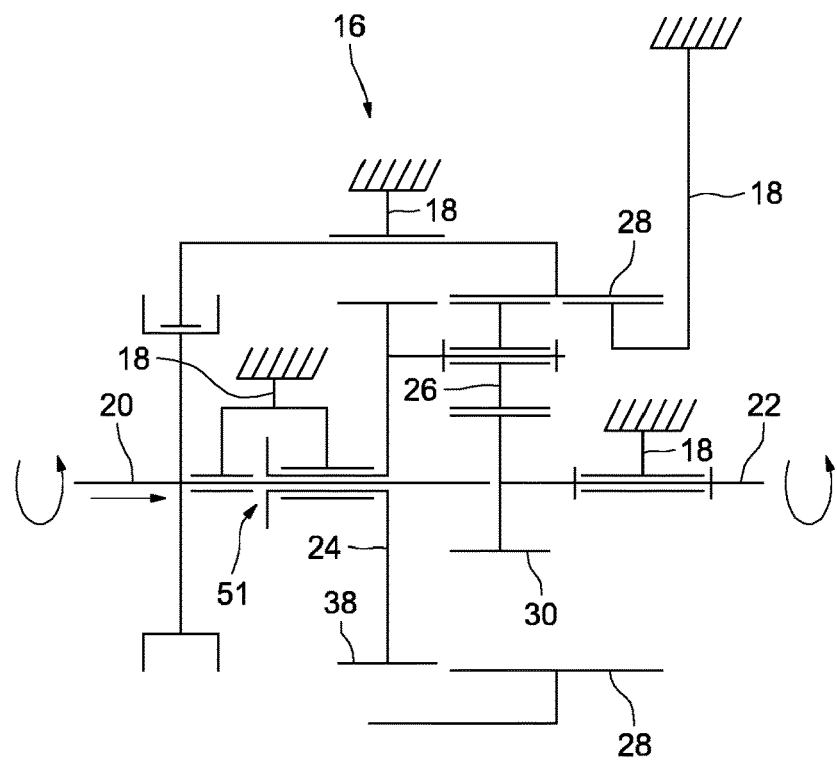
Figure 8:
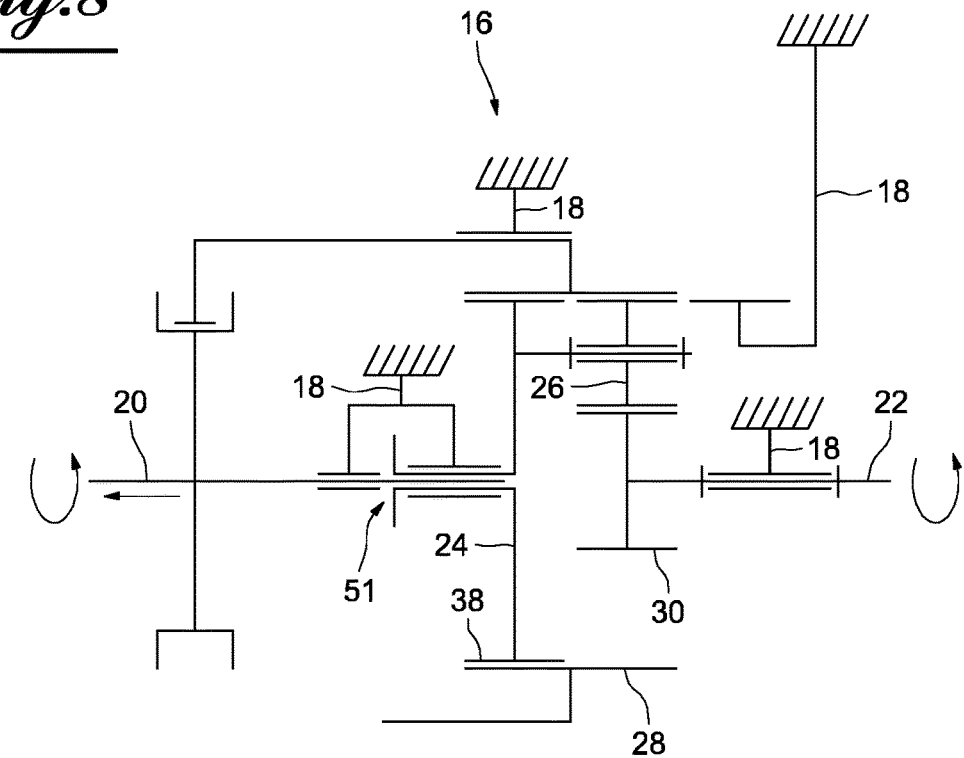

FIGS. 5 and 6 are functional schematic illustrations of a first version of a second embodiment of an epicyclic gear train according to the invention, showing the latter respectively in its configuration for multiplying the speed and in its configuration with a 1:1 speed gear ratio; and FIGS. 7 and 8 are functional schematic illustrations of a second version of the second embodiment of the epicyclic gear train, showing the latter respectively in its configuration for multiplying the speed and in its configuration with a 1:1 speed gear ratio.

DETAILED DESCRIPTION

The invention will be described below, as a non-limiting example, as it applies to a multi-turn servomotor system as illustrated in FIG. 1.

According to the synaptic block diagram of this figure, the system comprises, mounted in series, a motor 1, an epicyclic gear train 3, a force limiter 5 and a reducing device 7 including a worm screw 8 and a gear wheel 9 driven by the screw 8 and secured in rotation with the output shaft 14 intended to drive an actuator member like the rotating member of a valve for closing and opening a pipe. The figure further shows, also mounted in series with the worm screw 8, a hand wheel 11 for manually actuating the actuator and a clutch system 13 and according to the invention, an epicyclic gear train 16 provided with a control member 17.

FIG. 2 shows the characteristic curve of the torque C of the moving actuator member of the valve as a function of the travel of this member between its open position O on the right side of the diagram and its closed position F on the left. One can see that the curve has two parts each defining a step of the process for closing the valve, namely a first phase a during which the torque C is relatively low and substantially constant and which is the approach phase of the rotating member before coming into contact with the seat of the valve, and the tightening phase b until closing of the valve.

When the valve must be closed manually, by actuating the hand wheel 11, the force necessary to close the valve and the force that the operator must exert on the hand wheel is relatively low in the approach phase a, but increases greatly during the phase b during which the actuated member, i.e., the membrane seal, is engaged on the seat of the valve.

According to the invention, it is proposed to optimize the use of the manual control by adapting it to the curve of FIG. 2. This aim is achieved by providing, between the two elements, namely the hand wheel and the rotating member for closing and opening the valve, during the approach phase a where the torque is approximately constant and low, an increase in the transmission speed between the two elements, i.e., the number of revolutions, relative to the transmission speed between the two elements in phase b, where the operator, to ensure closing, must provide a much greater force.

Indeed, in phase a where the torque is low, the invention makes it possible to reduce the number of revolutions to be applied to the hand wheel for a given valve travel. To that end, a multiplication is done between the hand wheel and the rotating member. Granted, since there is a multiplication, the force at the hand wheel must be greater relative to a transmission of the direct torque, without multiplication. However, inasmuch as the necessary torque is relatively low, by choosing an appropriate multiplication value, the increase in force may now have a value that is not bothersome for the operator. In phase b where the torque to be provided increases, the invention provides for returning to a direct transmission, which is equivalent to increasing the number of revolutions to be given to the hand wheel, relative to the phase a. But by thus increasing the number of revolutions to be applied to the hand wheel, the force to be supplied to the hand wheel is decreased.

To implement this objective, the invention proposes to place an epicyclic gear train with two speed gear ratios between the hand wheel 11 and the worm screw 8. Such an epicyclic gear train is shown, as a non-limiting example, in FIGS. 3 and 4. The epicyclic gear train according to the invention, denoted 16, comprises, contained in a case 18 between the input shaft 20 and the output 22, a planet carrier 24, secured in rotation with the shaft 20 and carrying three planet gears 26 each rotating around an axis 27 of the planet carrier, a ring gear 28 with inner teeth meshing with the planet gears 26 and a sun gear 30 driven by the planet gears and that is intended to be secured in rotation with the output shaft, not shown.

Figure 3:
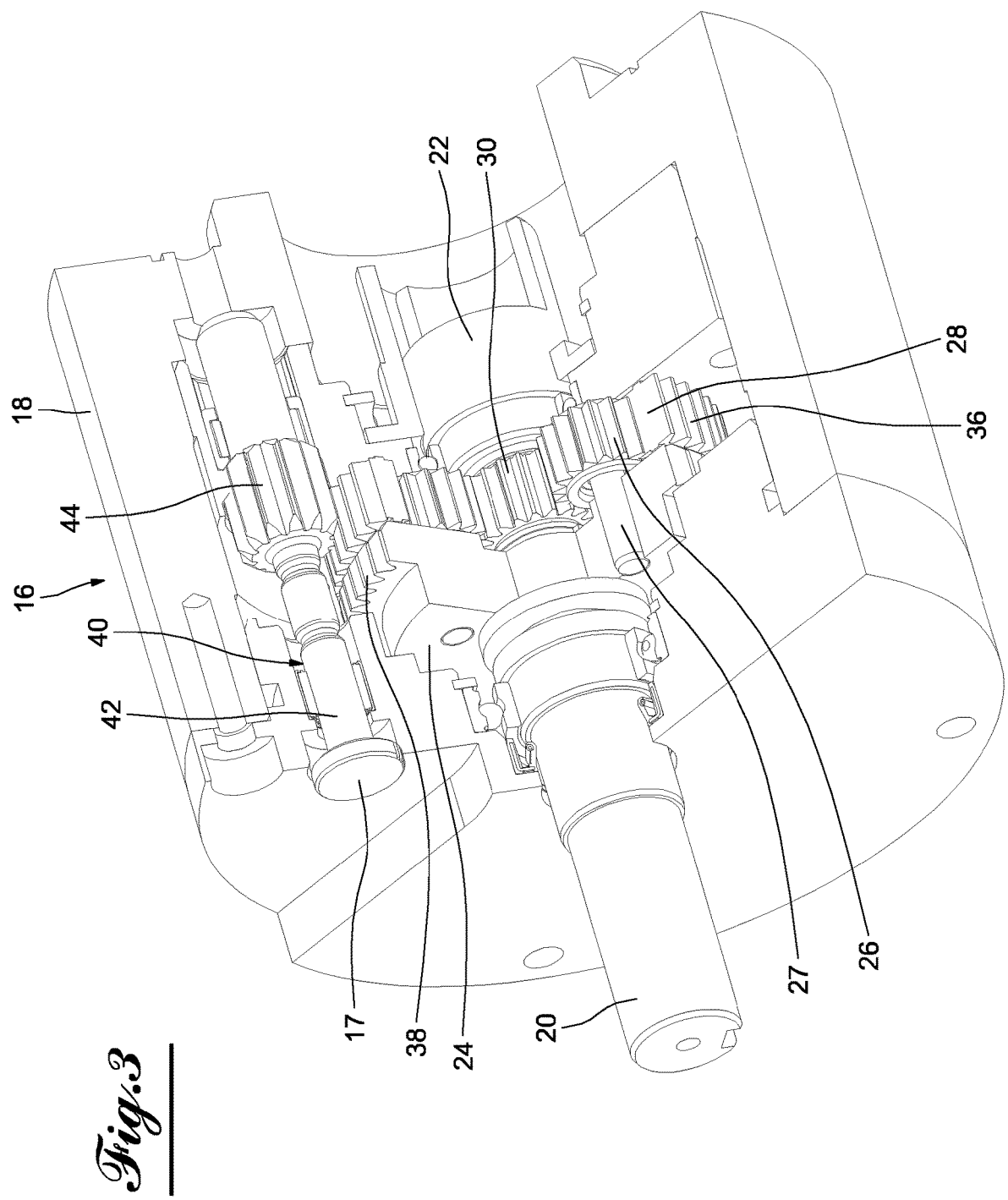
FIGS. 3 and 4 are perspective views of a first model embodiment of an epicyclic gear train according to the invention, showing the latter respectively in its configuration for multiplying the speed and in its configuration with a 1:1 speed gear ratio.

In this configuration, when the ring gear is blocked, i.e., immobilized in rotation in the case, according to FIG. 3, the planet gears 26 cause the sun gear 30 to rotate and the epicyclic gear train, between its input and output, produces a multiplication in the speed transmission, which is determined by the teeth of the components making up the gear train.

The rotation speed of the output shaft and therefore of the worm screw 8 is thus multiplied relative to the rotation speed that the operator applies to the hand wheel 11, relative to the multiplication of the epicyclic gear train.

According to the invention, the epicyclic gear train is used in the configuration of FIG. 3, in phase a where the torque to be supplied to the actuator member is low.

Conversely, to ensure the lowest rotation speed during phase b, which requires a higher torque and therefore a greater force from the operator, the epicyclic gear train 16 is provided with means that ensure a speed transmission between the input and the output with a 1:1 ratio.

To that end, the epicyclic gear train, according to the invention, is provided with a device 40 that allows the epicyclic gear train to operate in both speed ratio modes, and to select the desired ratio. In order for the device to be able to perform these functions, the ring gear is mounted freely rotating in the case and one provides, on the radially outer surface of the ring gear, outer teeth 36, and on the outer peripheral surface of the planet carrier, outer teeth 38. The selective control device 40 of the two operating modes with the different speed gear ratios includes a rod 42 that is movable in the case 18 in the radially outer part with respect to the planet carrier and the ring gear and carries a pinion 44. The rod 42 is movable parallel to the axis of the epicyclic gear train between the position shown in FIG. 3, in which the pinion 44 meshes only with the outer teeth 36 of the ring gear and is blocked in rotation in the case 18 by engagement in teeth 45 of the latter (FIG. 4), and the position according to FIG. 4 in which the pinion 44 meshes both with the outer teeth 36 of the ring gear and the outer teeth 38 of the planet carrier.

It should be noted that in its engagement position only of the teeth 36 of the ring gear and the blocking of the rotation of the pinion, the ring gear is also immobilized in rotation. In this configuration, the epicyclic gear train therefore operates in the first multiplication mode of the output speed relative to the input speed. In its second position, according to FIG. 4, in which the pinion rotates freely in the case and meshes both with the teeth 36 of the ring gear and the teeth 38 of the planet carrier while thus securing the rotation of the ring gear and the planet carrier, the epicyclic gear train operates in the second 1:1 ratio mode. Indeed, given that the ring gear and the planet carrier are secured in rotation and therefore have the same rotational movement, the planet gears 26 cannot rotate around their axis. Consequently, since the planet gears are stationary relative to the planet carriers, the sun gear is also stationary relative to the latter, as a result of which the input speed is identical to the output speed and the epicyclic gear train thus produces the 1:1 gear ratio.

To be able to select the desired ratio, the rod includes, at its free outer end, a member, here as an example an actuating button that constitutes the control member 17 of FIG. 1 and makes it possible to command and select from the outside.

Figure 4:
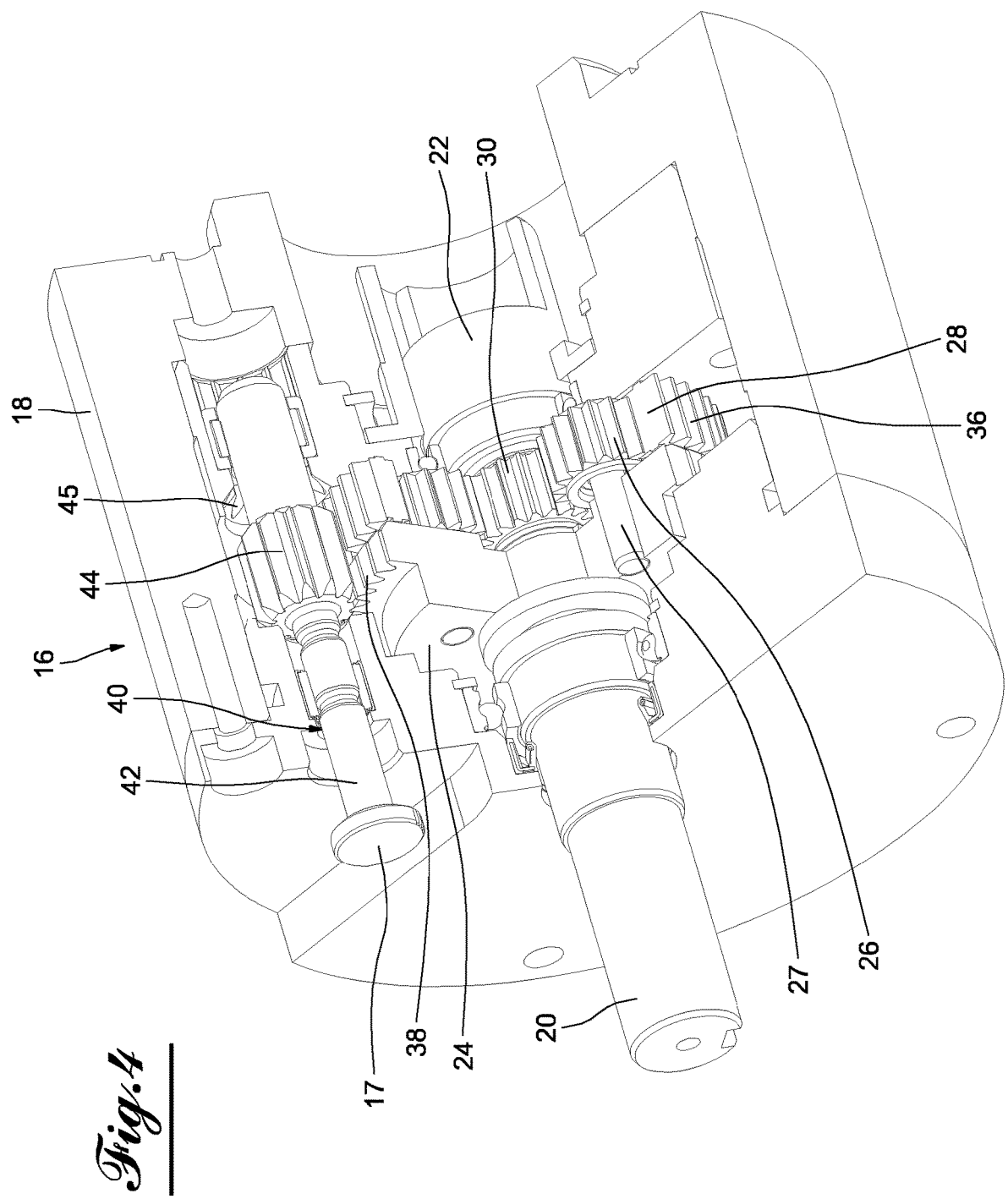

As emerges from the figures, the dual-speed command epicyclic gear train can be taken from its configuration of FIG. 4, for securing the ring gear and the planet carrier in rotation, to its configuration for blocking the rotation of the ring gear, according to FIG. 3, by pushing the rod into the case by pressing on the button 17. By pulling on the rod, the gear train returns to its configuration of FIG. 4.

The preceding description shows that the method for controlling the actuating member, by actuating the hand wheel 11, involves two operating phases, with different speed gear ratios, i.e., a first phase a that is characterized by a multiplication ratio of the speeds and a second phase b characterized by the 1:1 ratio.

Of course, this method is not limited to controlling a valve and can be applied to controlling any other appropriate actuator.

Regarding the epicyclic gear train, as described and shown in the figures, its use in the method and system described above is given as an example and is not limiting, and it may be used in any other technical field where dual-speed operation is desirable.

It should be noted that the epicyclic gear train itself, as described and shown, is only one example embodiment. Indeed, instead of providing a ring gear blocked in rotation in the case in its speed multiplication mode, i.e., the number of revolutions, between the input and the output of the epicyclic gear train, it is also possible to consider the ring gear rotating at a given speed that may for example be imposed by an appropriate rotation speed of the pinion, which would make it possible to modify the multiplication ratio. This modification can be done from the outside, for example by applying an appropriate rotational movement to the outer end of the rod carrying the pinion.

Another example implementation of the embodiment could be to eliminate the selector pinion by mounting the ring gear in the case such that it can slide between a position in which it is blocked in rotation in a cavity of the case, which makes it possible to obtain the multiplication, and a position in which it meshes with the outer teeth of the satellite carrier, which secures the ring gear and the satellite carrier in rotation to be able to obtain the 1:1 ratio.

FIGS. 5 to 8 give the diagram of two versions of this implementation of the embodiment using a ring gear sliding in translation. In these figures, the components already present in the first embodiment according to FIGS. 3 and 4 are designated using the same references.

FIGS. 5 and 6 illustrate a first implementation version of this second embodiment of an epicyclic gear train according to the invention, in which the ring gear 28 is mounted, as indicated by arrows, axially movable in the case 18 while sliding in 47 on a guide piece 48 that coaxially surrounds the input shaft 20 and is mounted stationary in the case. In FIG. 5, the ring gear 28 is in its position blocking the rotation in the case 18, while mashing only with the planet gears 26 of the planet carrier 24. As explained above, in this configuration, the epicyclic gear train works in its multiplication mode of the speed between its input 20 and its output 22, so as to correspond to FIG. 3. In the case of FIG. 6, the ring gear 28 is translated axially in its position meshing only with the outer teeth 38 of the planet carrier 24. In this position securing the ring gear 28 and the planet carrier 24 in rotation, the epicyclic gear train works in its transmission mode according to the 1:1 ratio, according to FIG. 4.

In the second implementation version of the second embodiment of the invention, in FIGS. 7 and 8, the ring gear 28 and the axis of the hand wheel, i.e., the input shaft 20, form an assembly that is movable axially in the case 18, as indicated by the arrows. The rotational link between the input shaft 20 and the planet carrier 24 is done by sliding splines indicated schematically by reference 51. FIG. 7 shows the ring gear 28 in its position blocking rotation in the case 18, and FIG. 8 in its position securing in rotation with the planet carrier 24.

It is also possible to consider, in the context of the invention, reversing the structure of the epicyclic gear train by placing the sun gear at the input and the planet carrier at the output, which would make it possible to obtain an epicyclic gear train yielding, in one configuration, a 1:1 gear ratio, and in another configuration, a ratio where the output speed is lower than the input speed.

The invention claimed is:

1. An epicyclic gear train including:
   a case;
   a gear train disposed within the case, having an axis, and comprising a plurality of planet gears, a planet carrier carrying the plurality of planet gears, a ring gear, and a sun gear,
   a rotatable input member;
   a rotatable output member coupled to the input member by the gear train so that rotation of the input member at an input speed rotates the output member at an output speed that has a speed ratio relative to the input speed; and
   control means actuable from outside the case, for changing the speed ratio;
   wherein the ring gear is rotatingly mounted in the case and the control means imposes on the ring gear a rotation speed determined to produce a first speed ratio, and secures the ring gear and the planet carrier in rotation to produce a second speed ratio, and
   wherein the ring gear and the planet carrier include outer teeth and the control means comprises a pinion that is movable between a meshing position meshing with only the outer teethes of the ring gear, and a securing position securing the ring gear to the planet carrier in rotation by meshing of the outer teeth of the ring gear and the planet carrier.

2. The epicyclic gear train according to claim 1, wherein the ring gear is blocked from rotating in the case by the control means.

3. The epicyclic gear train according to claim 1, wherein the ring gear is moveably mounted in the case for movement between a first position, in which the ring gear is blocked from rotating in the case, and a second position in which the ring gear is secured to rotate with the planet carrier.

4. The epicyclic gear train according to claim 1, wherein in the meshing position, the speed ratio of the rotation speed of the input member transmitted to the output member is multiplied, and, in the securing position the speed ratio is 1:1.

5. The epicyclic gear train according to claim 1, wherein the pinion is mounted on the rod and the rod is movable axially in the case, parallel to the axis of the gear train, and the rod comprises, at an outer end, a control member for changing the speed ratio.

6. The epicyclic gear train according to claim 5, wherein the speed ratio is changed by pushing the control member into the case and by pulling the control member out from the case.

7. The epicyclic gear train according to claim 1, wherein the planet carrier constitutes the rotatable input member and the sun gear constitutes the rotatable output member.

8. A method for controlling a rotating actuator member of a a valve, comprising:
rotating the rotating actuator member by rotating a manually actuated hand wheel, between an open position of the valve and a closed position of the valve, wherein the rotation of the actuator member from the open position to the closed position includes a first face for approaching the closed position in which torque necessary is relatively low, and a second phase for reaching the closed position in which the torque necessary is relatively high, and
multiplying during the first approach phase relative to the second phase, number of revolutions of the handwheel relative to number of revolutions of the rotating actuator member.

9. The method according to claim 8, including coupling the hand wheel to the rotating actuator member with an epicyclic gear train to multiple the number of revolutions of the hand wheel relative to the number of revolutions of the rotating member.

10. The method according to claim 9, wherein during the second phase, the ring gear and the planet carrier are secured together in rotation by the pinion, and, during the first phase, the ring gear is separated from the planet carrier.

11. A servomotor system for controlling an actuator member of a valve, in opening and closing the valve, comprising:
a worm screw device;
a gearwheel driven by the worm screw;
a manual control hand wheel rotated by the gear wheel for rotation of the actuator member; and
an epicyclic gear train according to claim 5 interposed between and coupling the hand wheel and the worm screw.

* * * * *